United States Patent [19]

Stange et al.

[11] 4,034,869

[45] July 12, 1977

[54] FLUID MEANS TO LOAD AND UNLOAD A VERTICALLY MOVABLE DOCUMENT STORAGE RACK

[75] Inventors: Klaus K. Stange, Pittsford; Richard E. Smith, Webster; Thomas J. Hamlin, Macedon; James R. Cassano, Penfield, all of N.Y.

[73] Assignee: Xerox Corporation, Stamford, Conn.

[21] Appl. No.: 638,584

[22] Filed: Dec. 8, 1975

[51] Int. Cl.² .................................... B65G 47/00
[52] U.S. Cl. ........................... 214/16.4 R; 302/2 R; 221/278
[58] Field of Search .......... 214/16.4 R, 1 BH, 1 BS, 214/1 BT, 1 BE; 302/2 R, 29; 221/211, 278

[56] References Cited

U.S. PATENT DOCUMENTS

| | | | |
|---|---|---|---|
| 2,842,923 | 7/1958 | Kjellsen | 302/2 R |
| 3,174,645 | 3/1965 | Barcia et al. | 221/278 X |
| 3,293,414 | 12/1966 | Barcia | 302/2 R |
| 3,499,555 | 3/1970 | Wahle | 214/16.4 R |
| 3,715,040 | 2/1973 | Polus et al. | 214/16.4 R |
| 3,730,595 | 5/1973 | Yakubowski | 302/2 R |
| 3,888,725 | 6/1975 | French | 221/278 X |
| 3,902,773 | 9/1975 | Gondek | 214/16.4 R X |
| 3,930,684 | 1/1976 | Lasch et al. | 302/2 R |

Primary Examiner—Robert J. Spar
Assistant Examiner—R. B. Johnson
Attorney, Agent, or Firm—Carlos Nieves; James J. Ralabate

[57] ABSTRACT

Apparatus for storing documents includes a rectangular housing having first and second openings on a front wall and first and second spaced manifolds mounted on the back wall in horizontal alignment with the openings. A vertically movable rectangular rack is mounted in the housing, the rack having a plurality of pockets whose entrance may be aligned with the openings. Also, each pocket communicates with one of a plurality of sets of holes in the rack, each set being alignable with the manifolds. With vacuum pressure supplied to the first manifold fluid flows through the first opening, through a pocket, and through a corresponding set of holes. Thus, a document inserted into the first opening is drawn into a pocket of the rack. The rack may be stepped along and all of its pockets may be filled with documents. With pressure applied to the second manifold fluid is injected through a set of holes into a pocket and the fluid flows out through the second opening. With documents in the rack, if the rack is stepped along all of the documents stored may be ejected.

8 Claims, 5 Drawing Figures

FLUID MEANS TO LOAD AND UNLOAD A VERTICALLY MOVABLE DOCUMENT STORAGE RACK

The subject invention generally relates to apparatus for storing and feeding documents and to fluidic transports, such as disclosed in co-pending U.S. patent application Ser. No. 627,471, Pneumatic Registration Apparatus, filed on Oct. 31, 1975, on an invention by Klaus K. Stange, the application being assigned to the assignee herein, Xerox Corporation.

The public is aware of apparatus for storing and feeding documents wherein documents are stored in a bin and drive rollers engaging the top of the stack serially discharge the documents from the bin. In such apparatus frictional forces cause the documents to rub against each other and when the documents are repeatedly subjected to such treatments images on the documents and the documents themselves deteriorate. As an alternative to such apparatus suction or fluidic means have been devised for lifting documents from the top of a stack of documents and for transporting the documents. However, since documents are frequently provided on sheets of porous paper, these devices tend to pick up more than one document at a time and this interferes with serial feeding which is frequently desired.

It is an object of the present invention to provide apparatus for storing documents in superposed fashion and for serially delivering the documents.

It is another object of the present invention to provide apparatus for storing documents and for fluidically discharging stored documents.

Still another object of the present invention is to provide storage apparatus wherein documents are fluidically drawn into a rack for storage and wherein said documents are fluidically discharged as desired.

Briefly, the invention disclosed herein includes:(a) a housing having an opening; (b) a rack located in the housing and having a pluarlity of superposed pockets for storing documents; (c) means for moving the rack to successively align each of said pockets with the opening; and (d) first fluidic means for moving documents, in pockets brought into alignment with the opening, through the opening.

Additional objects and features of the invention will become apparent by reference to the following description in conjunction with the accompanying drawings, in which.

Figure 1:
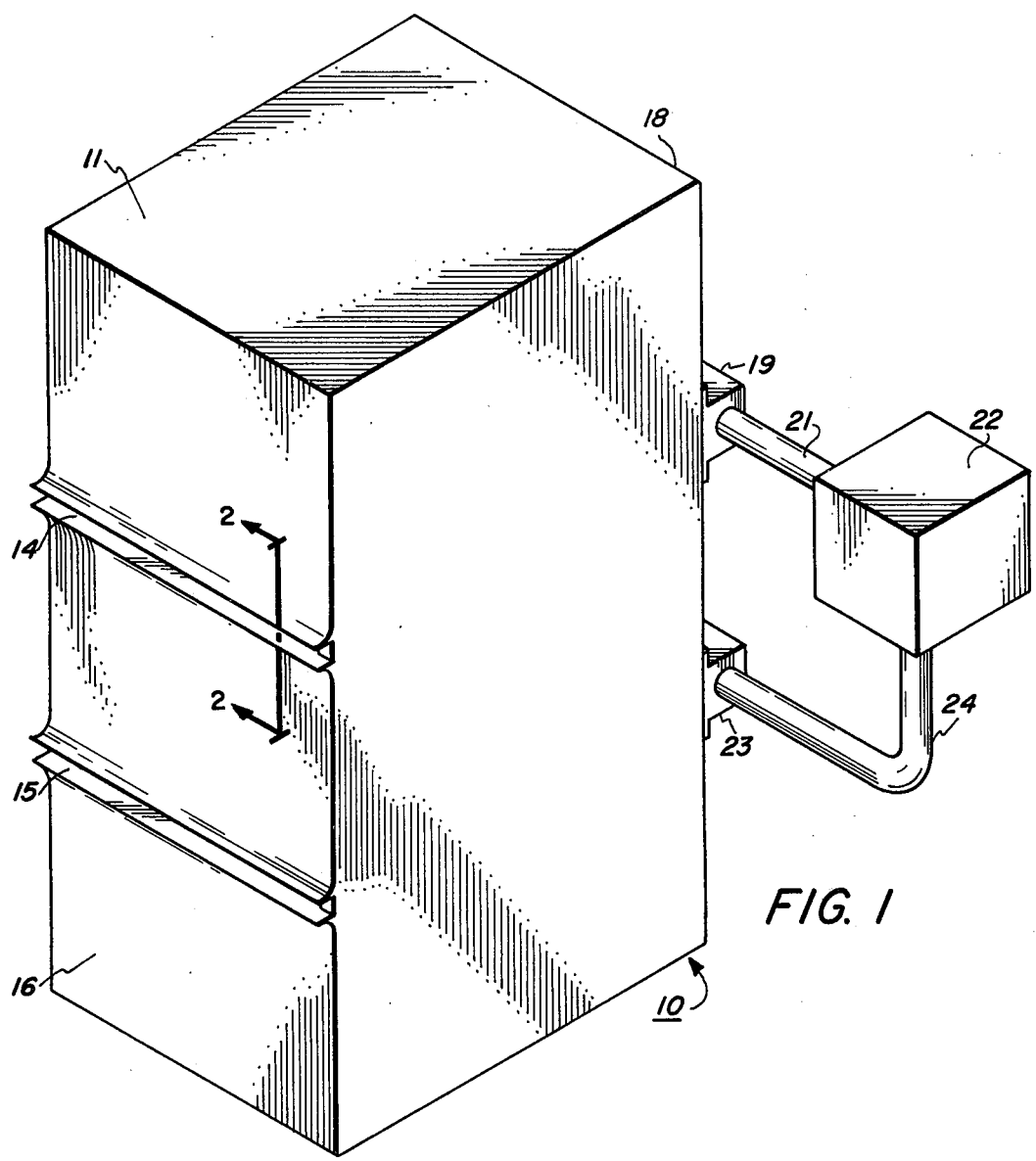
FIG. 1 is a perspective view of apparatus for storing documents, according to the invention.
Figure 2:
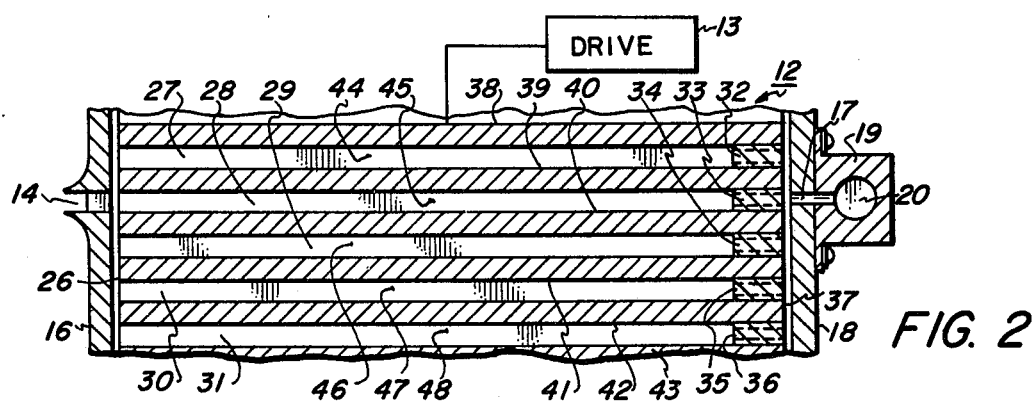
FIG. 2 is a partial cross-sectional view of the storage apparatus, the view having been taken along lines 2—2 in FIG. 1.
Figure 3:
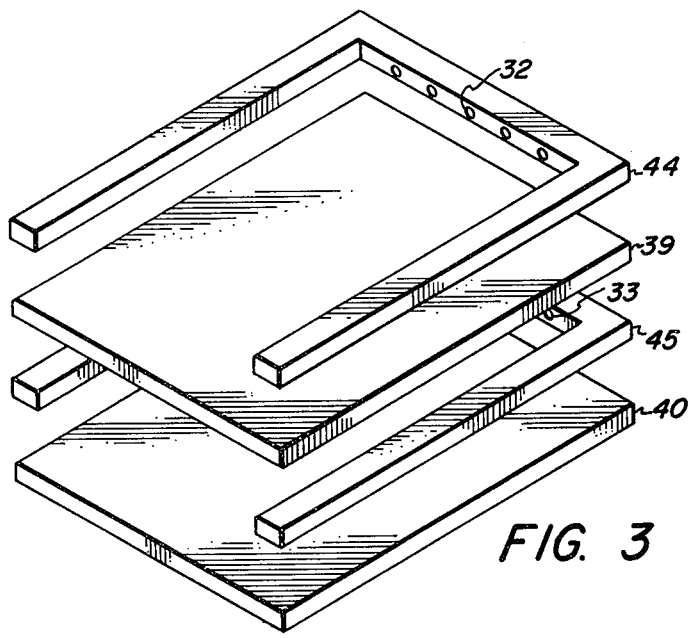
FIG. 3 is a partial exploded view of a storage rack of the apparatus.

Referring to FIGS. 1 and 2, apparatus for storing documents 10, according to the invention, includes a generally rectangular housing 11 within which there is mounted a rack 12 and means for moving the rack up and down 13. Housing 11 includes a pair of spaced horizontal openings 14 and 15 on the front wall 16 and a pair of horizontally disposed elongated holes 17 (only one shown) on the back wall 18. Opening 14 and hole 17 are located at one horizonal level and opening 15 and the other hole are located at another horizontal level. Wall 18 supports a manifold 19 having a chamber 20 communicating with hole 17 and manifold 19 is coupled by a conduit 21 to a fluid source 22, more fully discussed below. Similarly, wall 18 supports a manifold 23 having a chamber communicating with the other hole (not shown), manifold 23 being coupled by a conduit 24 to the fluid source. Rack 12 is a rectangular structure having a plurality of superposed pockets 27–31 (not shown) horizontally extending from a front side of the structure 26 and a plurality of sets of holes 32–36 (not all shown), each set extending through the back wall 37 of the structure and communicating with one of the pockets. As shown in FIGS. 2 and 3, the rack may be manufactured from rectangular plates 38–43 (not all shown); U-shaped spacers 44–48 (not all shown) interposed between plates, each of the spacers including one of said sets of holes; and means for securing the spacers and plates together. Typically, the spacers and plates are fixed to each other with an adhesive; but, bolts (not shown) extending vertically through the plates and spacers and nuts cooperating therewith may be used.

Opening 15 is located such that when the rack 12 is in its lowermost position the top pocket of the rack is aligned therewith and its corresponding set of holes is aligned with the lower hole in the back wall 18. Therefore, if a vacuum pressure is applied to manifold 23 fluid is drawn through the opening, through the pocket, and through a set of holes. As a result, if a document is presented to the opening 15 it is moved into the pocket. If the rack 12 is moved upwardly in increments corresponding to the distance between adjacent pockets, the rack may be filled with documents. Opening 14 is located such that when rack 12 is in its uppermost position the bottom pocket of the rack is aligned therewith and its corresponding set of holes is aligned with hole 17. Therefore, if fluid pressure is applied to manifold 19 fluid is injected through a set of holes into the bottom pocket and a document located in that pocket will be ejected through opening 14. It will be appreciated that all of the documents in the rack may be discharged as the rack is either stepped up or down. Moreover, it should be noted that the rack may be loaded through opening 14 and unloaded through opening 15 if manifold 19 is supplied with vacuum pressure and manifold 23 is supplied with pressurized fluid. Alternatively, an opening and manifold may be dispensed with if the other of the manifolds is coupled to a reversible pump. Rack 12 may be loaded in still other ways. For example, sections on one side of the spacers may be removed and opening 15 may be relocated to a side wall of the housing. In this event, manifold 23 may be dispensed with and documents may be loaded into pockets through the relocated opening and the spaces provided by the removed sections. If desired, the opening may be replaced with a glass door which may be opened for loading documents and which provides an operator with a view of system malfunctions and document alignment. In still another example, the section of the spacers including the sets of holes is dispensed with, the location of the manifold 23 and opening 15 are reversed, and suitable holes are provided for coupling the manifold chambers to the housing. With this arrangement, documents are moved into the housing from one side and exit through the opposite side.

From the foregoing, it will be appreciated that drive 13 must be capable of aligning each of the pockets or document sheets with one of the openings and as is well known to those skilled in the elevator art, this may be accomplished with motors, pulleys, and sensors or with rack and pinon drives, etc.

Figure 5:
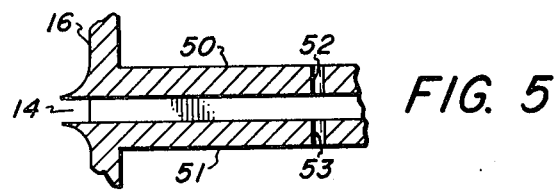
FIG. 5 is a partial cross-sectional view of the apparatus, taken along line 5—5 in FIG. 4.
Figure 4:
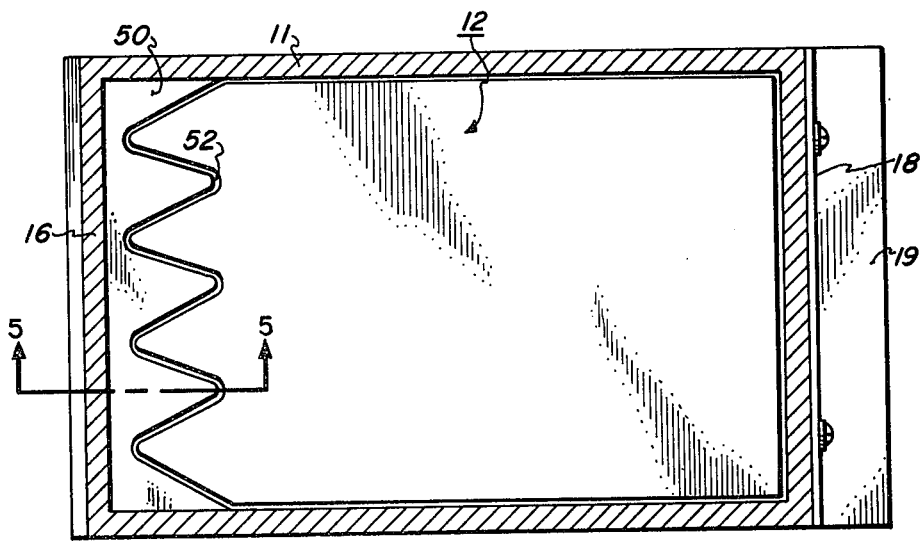
FIG. 4 is a top plan view of another embodiment of storage apparatus, according to the invention, a top portion of the apparatus having been removed to show the interrelationship between a rack and the housing of the apparatus.

Wall 26 of the rack is in near abutment with wall 16 of the housing to minimize the loss of fluid when it is moving between and opening an a pocket. However, the gap is bounded by edges which can conceivably hang up a flimsy sheet moving in or out of a pocket. If such sheets are to be stored, the apparatus described may be modified as shown in FIGS. 4 and 5. More specifically, each of the openings 14 and 15 may include a pair of projections 50 and 51 having similarly curved ends 52 and 53 and the front of the rack may be modified so that each of the plates is similarly curved. With this arrangement if a sheet strikes one of the curves the impact area will be small and the sheet will tend to continue on its way into or out of a pocket.

It is to be understood that the description herein of preferred embodiments, according to the invention, have been set forth as examples thereof and are not to be construed or interpreted as limitations on the claims which follow and define the invention.

What is claimed is:

1. Apparatus for storing documents, comprising:
  a. a housing having an opening;
  b. a rack located in the housing and having a plurality of parallel pockets for storing documents, the rack including a number of plates, a plurality of spacers, and means for fixing the spacers to the plates to provide the pockets;
  c. means for moving the rack to successively align each of said pockets with the opening; and
  d. first fluidic means for moving documents, in pockets brought into alignment with the opening, through the opening;

said housing including, on one side of the opening, an internal projection having a curved end and, on the other side of the opening another internal projection having a similarly curved end, each of the plates on the rack having a similarly curved end, adjacent plates being in near contact with the curved ends of the projections when a pocket is aligned with the opening.

2. Apparatus as defined in claim 1 wherein each spacer includes a set of holes, and wherein said fluidic means includes means for injecting fluid to any one of the sets of holes when the pocket with which the set communicates is aligned with the opening.

3. Apparatus as defined in claim 2 wherein said means for injecting fluid includes a hole in the housing, a pump, and means for directing fluid from the pump through the hole, the hole being located so as to communicate with said any one of the sets of holes when the pocket with which the set communicates is aligned with the opening.

4. Apparatus as defined in claim 2 wherein said pump is reversible and in a vacuum mode of operation draws documents inserted into the opening into a pocket aligned with the opening.

5. Apparatus as defined in claim 1 wherein said housing includes another opening and second fluidic means for moving documents inserted through said another opening into a pocket aligned with said another opening.

6. Apparatus as defined in claim 5 wherein said rack includes: a number of plates; a plurality of spacers; means for fixing the spacers to the plates to provide the pockets.

7. Apparatus as defined in claim 6 wherein each spacer includes a set of holes, and wherein said first fluidic means includes means for injecting fluid to any one of the sets of holes when the pocket with which the set communicates is aligned with said opening.

8. Apparatus as defined in claim 7 wherein said second fluidic means includes means for drawing fluid from a pocket aligned with said another opening, the fluid being drawn through a set of holes communicating with the pocket aligned with said another opening.

* * * * *